No. 613,956. Patented Nov. 8, 1898.
L. ANDERSON.
BELT GUIDE.
(Application filed Feb. 25, 1898.)

(No Model.)

Witnesses:

Inventor
Louis Anderson
By James J. Sheehy
Attorney

UNITED STATES PATENT OFFICE.

LOUIS ANDERSON, OF HILLSBOROUGH, NORTH DAKOTA.

BELT-GUIDE.

SPECIFICATION forming part of Letters Patent No. 613,956, dated November 8, 1898.

Application filed February 25, 1898. Serial No. 671,658. (No model.)

*To all whom it may concern:*

Be it known that I, LOUIS ANDERSON, a citizen of the United States, residing at Hillsborough, in the county of Traill and State of North Dakota, have invented new and useful Improvements in Belt-Guides, of which the following is a specification.

My invention relates to belt-guides or devices for preventing belts from flying off pulleys; and it has for its general object to provide a cheap and simple device adapted to prevent the belt of a threshing-machine engine from flying off the drive-pulley thereof and one which is so constructed as to permit of the belt being conveniently placed upon or removed from the pulley when desired.

With the foregoing ends in view the invention will be fully understood from the following description and claim when taken in conjunction with the annexed drawings, in which—

Figure 1:
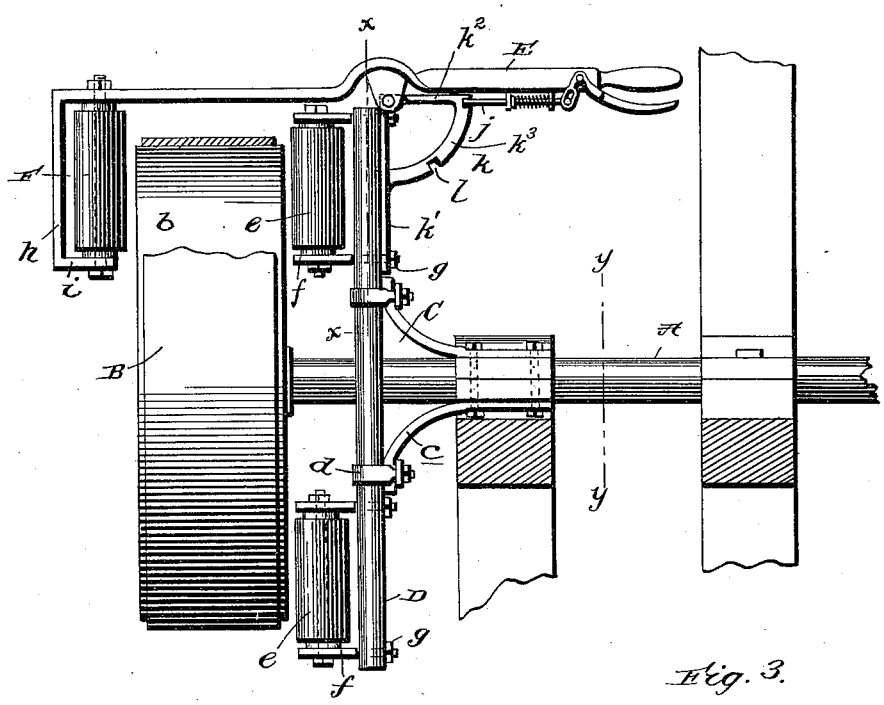
Figure 2:
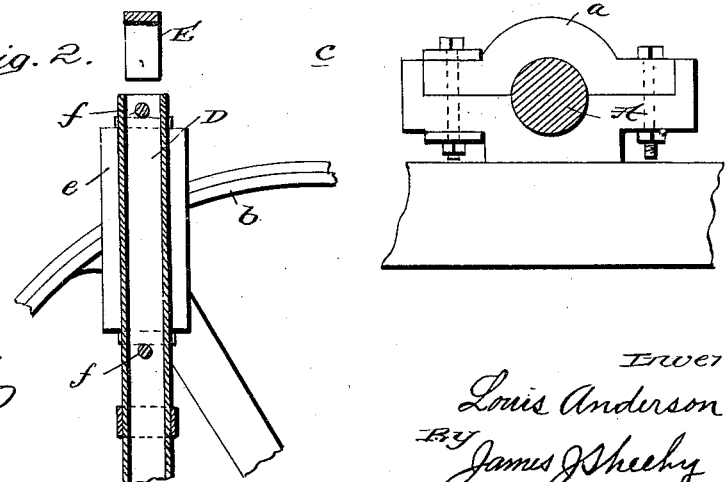
Figure 3:
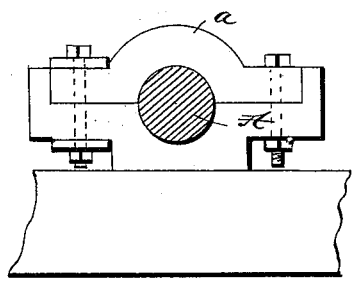

Figure 1 is a view illustrating my improved belt-guide in its operative position; and Figs. 2 and 3 are enlarged detail sections taken in the planes indicated by the lines $xx$ and $yy$, respectively, of Fig. 1.

Referring by letter to the said drawings, A designates the drive-shaft of a threshing-machine engine, which bears in a journal-box $a$ and is equipped with the usual pulley $b$.

B designates a belt which takes around the pulley $b$ and is designed to transmit motion from the engine to a threshing-machine. (Not illustrated.)

C designates a bracket which preferably comprises two arms $c$, connected to the journal-box $a$, as shown, and D designates the body-bar of the belt-guide, which is arranged at the inner side of the pulley $b$ and is of about the proportional length illustrated. The said body-bar D is connected by clips $d$ or other suitable means to the bracket-arms $c$ and is provided adjacent to its ends with two rollers $e$, which are disposed in the direction of its length and have for their purpose to prevent the belt from moving inwardly off the pulley. These rollers $e$ may be connected with the body-bar in any suitable manner. I prefer, however, to mount them between arms $f$, which are disposed at right angles to the bar D and have reduced portions extending through said bar and secured to the same by nuts $g$, as shown.

E designates a hand-lever which is fulcrumed at an intermediate point of its length on the upper end of the rack-frame, presently described, and has its outer end portion bent downwardly and thence inwardly, as indicated by $h$ and $i$, respectively, and F designates a roller which is mounted between the portion $i$ and the main portion of the lever E and is designed when in the position shown in Fig. 1 to prevent the belt from flying in an outward direction off the pulley $b$. The lever E is provided with a spring-pressed detent $j$, and the body-bar D is provided with a rack-frame $k$, having notches $l$ to receive the said detent. Consequently it will be observed that said lever may be fixed in the position shown in Fig. 1 to enable the roller F to serve the purpose stated, and may be readily released and swung on its fulcrum to raise the roller F, and may be fixed in an inclined position, so as to permit of the belt being readily placed upon and removed from the pulley when desired. This is an important advantange, because the frequent movements of threshing-machine engines from place to place render it necessary to often remove the belt from the pulley $b$.

In practice when the belt is on the pulley the rollers $e$ F occupy the positions shown in Fig. 1. In consequence the rollers $e$ are adapted to effectually prevent the belt from casually moving inwardly off the pulley and becoming entangled in and injured by the gearing with which threshing-machine engines are ordinarily provided, while the roller F is adapted to effectually prevent the belt from flying in an outward direction off the pulley. While this is so, it will be observed that the rollers do not engage the belt except when it tends to move laterally off the pulley, and therefore will not cause wear of the same.

My improved belt-guide is designed especially for use upon a threshing-machine engine; but I do not desire to be understood as confining myself to using it in such connection, as it may be employed to advantage in conjunction with any band-pulley and band or belt. I also do not desire to be understood as confining myself to the specific construction and relative arrangement of the parts as described, as such changes or modifications may be made in practice as fairly fall within the scope of my invention.

The rack-frame $k$, before described, is preferably constructed after the manner shown in Fig. 1, in one piece, and comprises a portion $k'$, which is secured on the ends of the arms $f$ by nuts $g$, a portion $k^2$, disposed at right angles to the portion $k'$, and a curvilinear portion $k^3$, in which the notches $l$ are formed.

Having thus described my invention, what I claim is—

A belt-guide comprising a bracket, a body-bar connected to the bracket and carrying a rack, rollers carried by said body and adapted to rest at one side of a belt, a lever fulcrumed at an intermediate point of its length at one end of the body-bar and having a detent adapted to seat in the notches of the rack on said body-bar, and a roller carried by said lever and adapted to rest at the opposite side of a belt with respect to the first-named rollers, substantially as specified.

In testimony whereof I have hereunto set my hand in presence of two subscribing witnesses.

LOUIS ANDERSON.

Witnesses:
J. E. LASHAM,
JAMES GRADY.